United States Patent [19]

Hishi

[11] Patent Number: 4,710,836
[45] Date of Patent: Dec. 1, 1987

[54] MAGNETIC HEAD

[75] Inventor: Yuichi Hishi, Miyagi, Japan

[73] Assignee: Alps Electric Co., Ltd., Japan

[21] Appl. No.: 821,596

[22] Filed: Jan. 23, 1986

[30] Foreign Application Priority Data

Jan. 23, 1985 [JP] Japan .............................. 60-7477[U]

[51] Int. Cl.⁴ ......................... G11B 5/54; G11B 5/016; G11B 5/58
[52] U.S. Cl. .................................... 360/106; 360/99; 360/105
[58] Field of Search ............................... 360/104–106, 360/109, 97–99

[56] References Cited

U.S. PATENT DOCUMENTS 4,549,239 10/1985 Kawajiri .............................. 360/105
4,605,979 8/1986 Inoue et al. .......................... 360/105

FOREIGN PATENT DOCUMENTS 60-7609 1/1985 Japan .................................... 360/104

Primary Examiner—John H. Wolff
Attorney, Agent, or Firm—Guy W. Shoup

[57] ABSTRACT

A magnetic head having an upper head and a lower head disposed opposite to each other and capable of simultaneously reading information from or writing information in both sides of a magnetic disc inserted therein. The upper head is fixed to a wingable arm at correct vertical position and inclination, while the lower head is mounted through a gimbals spring on a carriage which is slidable along a guide rod or guide rods in the radial direction of the magnetic disc. Since the upper head is positioned correctly and the surface thereof facing the lower head serves as a datum surface, the inclination of the lower head need not be adjusted in assembling the magnetic head, and thereby the process for assembling the magnetic head is remarkably simplified.

3 Claims, 3 Drawing Figures

MAGNETIC HEAD

BACKGROUND OF THE INVENTION

1. Field of the Invention

The present invention relates to a magnetic head for a magnetic recording reproducer.

2. Description of the Prior Art

In most two-sided disc recording reproducers employing a magnetic head consisting of an upper head assembly and a lower head assembly, a gimbals head and a button head are used as the upper head assembly and the lower head assembly, respectively, and a magnetic disc is inserted between the upper and lower head assemblies for writing and reading information. The button head is formed by fixing a convex head holder having a head burried therein to a supporting member, while the gimbals head is formed by securing or joining a gimbals spring carrying a head to a supporting member.

FIG. 2 is a sectional view of a conventional magnetic head of such a type. In FIG. 2, there are shown a disc 5, a carriage 100, a lower head 101 fixed to the carriage 100, an arm 102, an upper head 104 attached through a gimbals spring 103 to the arm 102 so as to be swingable, a pivot 105 formed in the arm 102 for supporting the upper head 104, a leaf spring 106 supporting the arm 102 so that the upper head 104 is movably supported opposite to the lower head 101, a holding member 107, and a compression spring 108 interposed betwen the arm 102 and the holding member 107.

FIG. 3 is a plan view of the ginbals spring as viewed from the side of the upper head 104 in FIG. 2. In FIG. 3, there are shown a frame 109, a spring plate 110, a holder 111, a first supporting arm 112, and a second supporting arm 113. The holder 111 fixedly holding the upper head 104 is supported so as to be swingable in the directions indicated by a double-headed arrow A on the first supporting arm 112 and in the directions indicated by a double-headed arrow B on the second supporting arm 113. The holder 111 turns in either of the directions of the double-headed arrow B so that the upper head 104 is aligned correctly with the lower head 101 when the disc 5 is held between the upper head 104 and the lower head 101, even if the arm 102 is tilted to one side or the other. The holder 111 turns in either of the directions of the double-headed arrow A to prevent the upper head 104 tilting in the direction of turning of the arm 102 due to the variation in the thickness of the disc 5 when the disc 5 is held between the upper head 104 and the lower head 101 and to correct the tilt of the arm 102 resulting from the bending of the leaf spring 106 so that the face of the upper head 104 is always parallel to the face of the lower head 101.

A method of assembling the magnetic head of this type will be explained briefely. First, the vertical and horizontal positions, the height and the azimuth of the lower head 101 with respect to the carriage 100 is adjusted finely means of a microscope. The inclination of the lower head 101 with the respect to the carriage 100 is adjusted finely by means of a collimator. Then, the vertical and horizontal positions, the height and the azimuth of the lower head 101 is reconfirmed by means of a microscope, and when readjustment is performed, the inclination of the lower head 101 is reconfirmed by means of a collimator.

Practically, the carriage 100 is secured to the pallet, the lower head 101 is supported so that the position thereof is adjustable and the pallet is transferred between the microscope and the collimator for the above-mentioned fine adjustment. The collimator is a device for measuring the inclination of a surface by projecting a light beas on the surface and detecting the direction of reflection of the light beam. The microscope having a small depth of field is employed for the fine adjustment, and hence it is found that the surface is at a correct height when the surface is in focus.

On the other hand, the upper head 104 is attached to the arm 102 without any adjustment. The vertical and horizontal positions and the azimuth of the upper head 104 is adjusted in attaching the arm 102 to the carriage 100.

Thus such a conventional magnetic head requires very delicate and complicated adjustment in securing the lower head 101 to the carriage 100.

SUMMARY OF THE INVENTION

Accordingly, it is an object of the present invention to provide a magnetic head which requires simple adjustment.

The present invention provides a magnetic head for writing information in and reading information from both sides of a magnetic disc with a pair of head assemblies, comprising: a carriage (1) mounted through a gimbals spring (103) with a lower head (7); an arm (2) having a supporting portion (19) which is placed in contact with the carriage (1), capable of turning about the supporting portion (19) and fixedly mounted at the free end thereof with an upper head (14); and coil spring (9) for urging the arm (2) so the upper head (14) is pressed against the lower head (7).

In this magnetic head, since the upper head (14) mounted on the arm (2) is in contact with the lower head (7) mounted on the carriage (1) and the supporting portion (19) of the arm (2) is in contact with the carriage (1), the arm (2) is held stably within a plane. Therefore, the upper head (14) serves as a datum level regarding the inclination of the swingable lower head (7), and hence the magnetic head is able to write information in or to read information from both sides of the magnetic disc (5) stably.

In assembling such a magnetic head according to the present invention, the lower head (7) can be attached to the carriage (1) without any adjustment and the position of the lower head (7) is adjusted afterward by means of a microscope, while only the inclination and height of the upper head (14) need to be adjusted in attaching the upper head (14) to the arm (2), which can be easily achieved by means of a combination of a collimator and a laser length measuring apparatus. Thus, the process for assembling the magnetic head is simplified remarkably.

The above and other objects, features and advantages of the present invention will become more apparent from the following description of a preferred embodiment thereof taken in conjunction with the accompanying drawings.

BRIEF DESCTIPTION OF THE DRAWINGS

DETAILED DESCRIPTION OF THE PREFERRED EMBODIMENT

Figure 1:
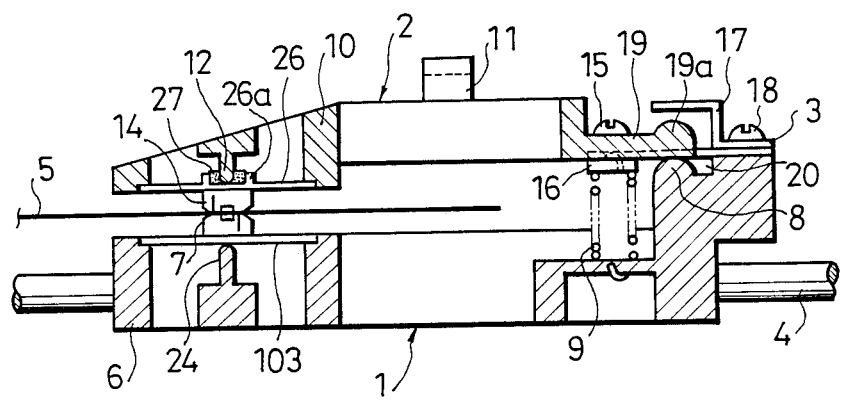
FIG. 1 is a sectional view of a magnetic head, in a preferred embodiment, according to the present invention.
Figure 2:
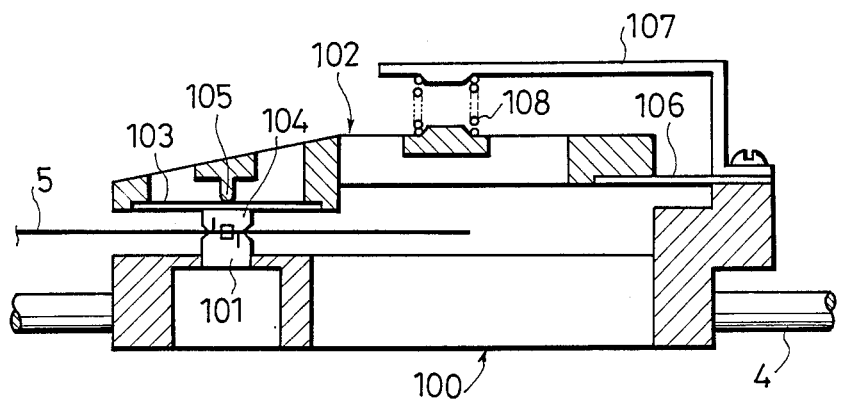
FIG. 2 is a sectional view of a conventional magnetic head.
Figure 3:
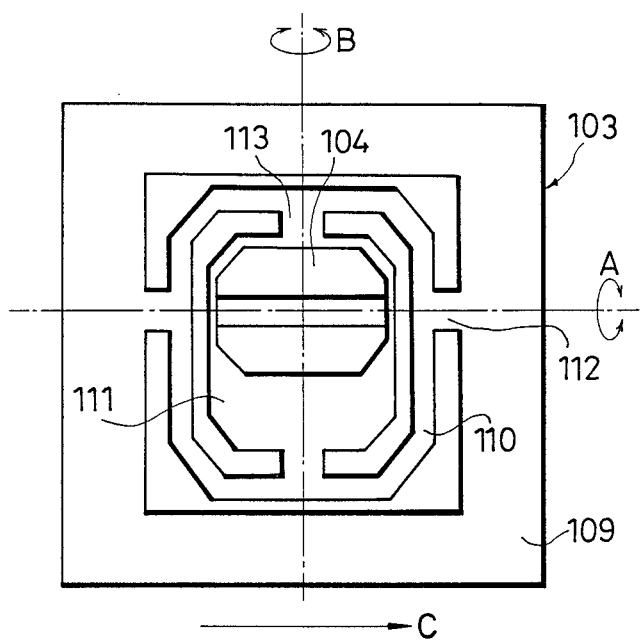
FIG. 3 is a plan view of a gimbals spring capable of being commonly employed in the embodiment of the present invention and in the conventional magnetic head.

Referring to FIG. 1, a magnetic head embodying the present invention comprises a carriage 1, an arm 2 and a leaf spring 3. The magnetic head is moved along a guide shaft 4 in the radial direction of a disc 5 by a pulse motor, not shown. The body 6 of the carriage 1 is formed of an insulating synthetic resin. A lower head 7 is supported and positioned through the same gimbals spring 103 as that employed in the above-mentioned conventional magnetic head, on a rigid pivot 24 at a correct position. A protrusion 8 is formed in the upper surface of the rear portion of the body 6 so as to be in contact with the arm 2. The coil spring 9 provided in front of the protrusion 8 to urge the arm 2 always toward the carriage 1. The body 10 of the arm 2 is formed of an insulating synthetic resin. In FIG. 1, indicated at 11 is a lifting arm for turning the arm 2 upward, and indicated at 26 is a gimbals spring for temporary positioning. The gimbals spring 26 has a wall 26a formed integrally therewith. The upper head 14 is fixed to the gimbals spring 26, while the gimbals spring 26 is fixed to the arm 2. The height and the inclination of the upper head 14 is adjusted with reference to a supporting part 19, and then an adhesive 27 is dropped into the space enclosed by the wall 26a to fix the upper head 14 to the arm 2. In measuring the height, the longitudinal and transverse positions and the azimuth need not be measured and hence the height and the inclination can be simultaneously measured by a combination of a laser length measuring apparatus and a collimator. On end of a metallic leaf spring 3 is fastened to the rear end of the body 10 of the arm 2 by a bolt 15 and a nut 16, while the other end of the same is fastened together with a holding member 17 to the carriage 1 with a screw 18. Supporting parts 19 each practically having the shape of a rectangular rod are formed on the opposite sides of the rear end of the body 10. The expanded end 19a of each supporting part 19 is in direct contact with the protrusion 8 of the body 6 and is positioned opposite to the lower surface of the holding member 17 with a small gap therebetween within a recess 20 formed between the protrusion 8 of the body 6 and the holding member 17. Since the supporting parts 19 are supported in a horizontal position on the protrusion 8 of the carriage 1, the arm 2 is never inclined widthwise.

When the disc 5 is not inserted between the upper head 14 and the lower head 7, the arm 2 is raised by a lifting mechanism, not shown, engaging the lifting arm 11 so that the upper head 14 is separated from the lower head 7 by a predetermined distance. If the arm 2 is raised excessively, the expanded ends 19a of the supporting parts 19 are brought into contact with the supporting member 17, and thereby the excessive bending of the leaf spring 3 is prevented.

When the disc 5 is put between the upper head 14 and the lower head 7, the lifting mechanism releases the arm 2 in synchronism with the insertion of the disc 5. Consequently, the arm 2 is turned downward by the resilient force of the coil spring 9, and thereby the upper head 14 and the lower head 7 hold the disc 5 therebetween for reading or writing information.

As is apparent from the foregoing description, according to the present invention, the magnetic head has a fixed upper head and a lower head supported on a gimbals, and the upper head serves as a datum plane for the lower head. Accordingly, the inclination of the lower head need not be adjusted in assembling the magnetic head, and hence the magnetic head of the present invention can be simply assembled.

Although the invention has been described in its preferred form with a certain degree of particularity, it is to be understood that many changes and variations is possible in the invention without departing from the scope and spirit thereof.

What is claimed is:

1. A magnetic head capable of reading information from or writing information on both sides of a magnetic disc inserted therein, comprising:
    a carriage slidably supported on a guide rod so as to be slidable in the radial direction of the magnetic disc;
    an arm joined at the rear end thereof through an elastic member to the rear end of the carriage so as to be swingable on the elastic member;
    an upper head fixed to the free front end of the arm;
    a lower head mounted through a gimbal spriing on the carriage opposite to the upper head;
    resilient means urging the arm toward the carriage so that the upper head is pressed against the lower head;
    a pivot defining the vertical position of the upper head with respect to the arm;
    a pivot defining the vertical position of the lower head with respect to the carriage; and
    a holding member for inhibiting the excessive upward turning of the arm,
    wherein said carriage has a supporting portion on the rear end thereof for abutting a lower surface of the rear end of the arm in order to define a stable vertical position of the arm when it is lowered toward the carriage so as to form a stable reference plane for the free end of the arm in which the upper head is located, whereby the vertical positions of the upper head and the lower head can be simply adjusted.

2. A magnetic head according to claim 1, wherein said elastic member is a leaf spring fixed at one end thereof to the reear end of the arm and at the other end thereof to the carriage so as to be bent to allow the upward turning of the arm.

3. A magnetic head according to claim 1, wherein said upper head is fixed adhesively to the arm.

* * * * *